(12) United States Patent
Dvoyrin et al.

(10) Patent No.: US 9,871,336 B2
(45) Date of Patent: Jan. 16, 2018

(54) FIBER AMPLIFIER

(71) Applicant: Norwegian University of Science and Technology, Trondheim (NO)

(72) Inventors: Vladislav Vladimirovich Dvoyrin, Trondheim (NO); Irina T. Sorokina, Vienna (AT)

(73) Assignee: ATLA LASERS AS, Flatåsen (NO)

( * ) Notice: Subject to any disclaimer, the term of this patent is extended or adjusted under 35 U.S.C. 154(b) by 919 days.

(21) Appl. No.: 14/269,229

(22) Filed: May 5, 2014

(65) Prior Publication Data

US 2015/0288131 A1 Oct. 8, 2015

Related U.S. Application Data

(60) Provisional application No. 61/819,165, filed on May 3, 2013.

(51) Int. Cl.
| | | |
|---|---|---|
| *H01S 3/00* | (2006.01) | |
| *H01S 3/067* | (2006.01) | |
| *G02F 1/35* | (2006.01) | |
| *H01S 3/094* | (2006.01) | |
| *H01S 3/0941* | (2006.01) | |

(Continued)

(52) U.S. Cl.
CPC ........ *H01S 3/0092* (2013.01); *H01S 3/06725* (2013.01); *H01S 3/06754* (2013.01); *G02F 1/355* (2013.01); *G02F 1/365* (2013.01); *G02F 2001/3528* (2013.01); *H01S 3/09415* (2013.01); *H01S 3/094007* (2013.01); *H01S 3/1616* (2013.01); *H01S 2301/03* (2013.01); *H01S 2301/085* (2013.01)

(58) Field of Classification Search
CPC .......... H01S 3/094003; H01S 3/06754; H01S 3/0092; H01S 3/302; G02F 1/353; G02F 2001/3528; G02B 6/03622; G02B 6/02
USPC ........................................................ 359/333
See application file for complete search history.

(56) References Cited

U.S. PATENT DOCUMENTS 5,880,877 A  *  3/1999  Fermann ............. H01S 3/06754
                                                        359/341.31
2009/0028193 A1     1/2009  Islam
(Continued)

FOREIGN PATENT DOCUMENTS

WO      2007/061732 A2     5/2007

OTHER PUBLICATIONS

J. Swiderski, et al., Mid-infrared supercontinuum generation in a single-mode thulium-doped fiber amplifier, Laser Physics Letters 10(2013) 035105 (6PP), XP-002726096.
(Continued)

*Primary Examiner* — Mark Hellner
(74) *Attorney, Agent, or Firm* — Eversheds Sutherland (US) LLP

(57) ABSTRACT

The present application provides an optical system. The optical system includes a fiber amplifier with an optically active doped fiber, a source of seed pulses, and a pump source. The doped fiber is doped with one or more active element(s) selected such that the seed pulses are amplified in intensity. The doped fiber has a negative (anomalous) group velocity dispersion in the region from the wavelength of the seed pulses to a threshold wavelength at which the magnitude of the optical loss of the doped fiber is greater than a gain due to stimulated Raman scattering.

27 Claims, 1 Drawing Sheet

(51) Int. Cl.
*H01S 3/16* (2006.01)
*G02F 1/355* (2006.01)
*G02F 1/365* (2006.01)

(56) References Cited

U.S. PATENT DOCUMENTS

2009/0204110 A1  8/2009  Islam
2012/0239013 A1  9/2012  Islam
2014/0001364 A1  1/2014  Islam

OTHER PUBLICATIONS

W. Q. Yang, et al., "Gain-switched and mode-locked Tm/Ho-codoped 2 um fiber laser for mid-IR supercontinuum generation in a Tm-doped fiber amplifier", Laser Physics Letters, 10(2013) 045106 (5pp). XP-002726097.

Jihon Geng, et al., "High-spectral-flatness mid-infrared supercontinuum generated from a Tm-doped fiber amplifier", Applied Optics, vol. 51, No. 7, Mar. 2012, pp. 834-840.

M. N. Islam, et al., "Broad bandwidths from frequency-shifting solitions in fibers", Optics Letters, vol. 14, No. 7, Apr. 1, 1989, pp. 370-372.

Ojas P. Kulkarni, et al., "Supercontinuum generation from ~1.9 to 4.5 um in ZBLAN fiber with high average power generation beyond 3.8 um using a thulium-doped fiber amplifier," J. Opt. Soc. Am. B, vol. 28, No. 10, Oct. 2011, pp. 2486-2498.

A.S. Kurkov, et al., "Mid-IR supercontinuum generation in Ho-doped fiber amplier," Laser Phys. Letter, 8, No. 10, 754-757 (2011)/DOI 10.102/lapl. 201110062.

\* cited by examiner

FIBER AMPLIFIER

TECHNICAL FIELD

The present application relates to an optical system comprising a fiber amplifier, and in particular, an optical system for efficient generation of ultra-short high-energy pulses and/or high-power optical supercontinuum.

BACKGROUND OF THE INVENTION

Supercontinuum radiation is a phenomenon whereby narrowband light propagating through a non-linear medium is transformed into a signal with very broad spectrum. Optical fibers are a natural choice of non-linear media.

J. Swiderski and M. Michalska, "Mid-infrared supercontinuum generation in a single-mode thulium-doped fiber amplifier" *Laser Phys. Lett.* 10 (2013) 035105 (6 pp), discloses a supercontinuum source comprising thulium-doped fibers. The wavelength of the output spectrum of the supercontinuum source extends from 1.75 to 2.7 μm. The method disclosed therein is as follows. Firstly, nanosecond seed pulses are amplified in a cascade of erbium and erbium:ytterbium fiber amplifiers. The amplified pulses are then passed into a single-mode fiber and are shifted to about 2.4 μm using soliton self-frequency shifting. The spectrum is extended above 2.4 μm by using a core-pumped thulium-doped fiber amplifier, and that radiation is then amplified in another section of thulium-doped fiber amplifier to produce the output supercontinuum. Increasing the pump power broadens the spectrum of the supercontinuum.

It will be appreciated that the above system is rather complex, and it would thus be advantageous to provide a simpler and more versatile fiber amplifier.

SUMMARY OF THE INVENTION

According to a first aspect of the invention, there is provided an optical system for outputting an optical output comprising: a fiber amplifier having an optically active doped fiber; a source of seed pulses; and a pump source; wherein the doped fiber is doped with one or more active element(s) selected such that the seed pulse is amplified in intensity, and the doped fiber has a negative (anomalous) group velocity dispersion in the region from the wavelength of the seed pulse to a desirable threshold wavelength at which the magnitude of the optical loss of the doped fiber is greater than a gain due to stimulated Raman scattering.

By virtue of the invention, in use, formation of a Raman soliton occurs due to stimulated Raman scattering. The Raman soliton is then shifted in the wavelength domain. The shifting of the Raman soliton is stopped at the threshold wavelength. Thus, there is disclosed herein an optical system for outputting an optical output comprising: a fiber amplifier comprising an optically active doped fiber; a source of seed pulses; and a pump source; wherein the doped fiber has a negative (anomalous) group velocity dispersion in the region from the wavelength of the seed pulse to the desirable threshold wavelength and it is doped with one or more active element(s) selected such that the seed pulse is amplified in intensity so that due to stimulated Raman scattering a formation of a Raman soliton occurs and a further shift of the soliton in the wavelength domain which is preferably stopped at a threshold wavelength at which the magnitude of the optical loss of the doped fiber is greater than a gain due to the stimulated Raman scattering.

By virtue of the present invention according to the first aspect, it is possible to produce as an output of the optical system an optical supercontinuum and/or a high-energy pulse shorter than the seed pulse and preferably comprising the predominant part of the output amplifier radiation without spectral filtering and spectrally shifted to the longer wavelength direction.

In preferred embodiments, the optical system is operable in a first and second mode, wherein in the first mode the optical system is operable to generate as the output a high-energy pulse shorter than the seed pulse and comprising the predominant part of the output amplifier radiation without spectral filtering and spectrally shifted to the longer wavelength direction, and wherein in the second mode the optical system is operable to generate as the output an optical supercontinuum. In such embodiments, it is preferably possible to change between the first operational mode and the second operational mode by changing at least one of the duration or intensity of the seed pulses, or changing the pump rate.

Preferably, the duration of the seed optical pulses is spectrally-limited, being less than 100 ps, in order to provide more efficient generation of the Raman soliton.

Preferably, the doped fiber has a steeply increasing optical loss at the threshold wavelength, the threshold wavelength being longer than the wavelength of the seed pulse. The magnitude of the optical loss is preferably chosen to overcome the gain due to stimulated Raman scattering at the peak intensity of the desired output pulse.

Preferably the fiber is silica-based. Alternatively, the fiber may be a germanate glass fiber, or a fiber with high (preferably >50%) germanium oxide content, or any other fiber with negative (anomalous) dispersion in the desired wavelength range, including but not limited to fluorozirconate glasses (e.g. ZBLAN), phosphate glasses or chalcogenide glasses.

The doped fiber may be doped with at least one element producing optical loss at the threshold wavelength. Preferably the fiber is doped with at least one element chosen from the rare-earth group, for example Nd, Er, Yb, Tm and Ho.

Thulium/holmium-doped fiber may be used in order to achieve broader gain which is preferable for supercontinuum generation.

Holmium-doped fiber may be used in order to decrease the spectral band in order to provide more efficient energy transfer to the soliton comprising the most part of the amplifier output energy. When holmium-doped fiber is used, the pump wavelengths are preferably chosen from the regions of 1.14-1.16 μm or 2-2.1 μm.

However, most preferably, the fiber is doped with thulium.

Therefore, according to a second aspect of the present invention, there is provided an optical system comprising: a thulium doped fiber amplifier; a pump source arranged to pump at a wavelength from 0.77 to 0.82 μm; and a source of seed pulses, the seed pulses having wavelengths from 1.8-2.1 μm.

By means of the invention according to the second aspect is it possible to generate a series of spectrally separated soliton pulses in the region from the seed pulse wavelength to 2.6 μm. It is also possible to generate (in a first mode of operation) a soliton pulse in the 2.2-2.8 μm region comprising the predominant part of the amplifier output radiation, and (in a second mode of operation) supercontinuum radiation from 1.8-2.6 μm. Changing from one operational mode to another may be achieved by changing the input parameters of the pump source and seed pulses.

Thus there is disclosed herein a fiber laser comprising an amplification chain for amplification of optical pulses, which has at least one amplifier cascade realized with an optical fiber doped with an optically active element, the doped fiber having a steep rise of an optical loss at a wavelength longer than that of the seed pulse and having a negative (anomalous) group velocity dispersion in the wavelength region from the seed spectral position to the optical loss edge (referred to also as threshold wavelength, or absorption edge). The optical loss value is chosen so that the optical loss overcomes the Raman gain at the desired peak intensity of the output pulse.

There is further disclosed a fiber laser comprising an amplification chain for amplification of seed pulses with spectral intensity maximum in the region of 1.8-2.1 μm, which has at least one amplifier cascade realized on a thulium-doped optical glass fiber with a negative group velocity dispersion in the region of 1.8-2.6 μm pumped at the wavelengths chosen from the region of 0.77-0.82 μm. With this configuration, it is possible to generate an ultra-short soliton pulse in the spectral range of 2.2-2.5 μm which carries the predominant part of the output amplifier radiation without applying a spectral filtering in any form. Moreover, it is possible to generate a series of spectrally separated soliton pulses in the spectral range from the seed laser wavelength up to 2.6 μm. Also, the amplifier can act as a supercontinuum light source in covering the region of 1.8-2.6 μm.

The optical loss may be natural or introduced by several techniques, such as cut-off of a fundamental mode in a special fiber or doping with chemical elements or introducing bending losses in order to obtain a sharp absorption edge at a desirable wavelength.

The operation principle of the amplifier is the shifting of the pulse in the wavelength domain due to stimulated Raman scattering which is stopped at a certain spectral point owing to the optical loss overcoming the Raman gain. At a certain threshold pump rate the amplifier produces one or a series of the Raman solitons from each input pulse, whereas the first Raman soliton is spectrally shifted with respect to the pulse, the second Raman soliton is spectrally shifted with respect to the first Raman soliton, and so on.

In a thulium-doped fiber amplifier, amplification in the $^3H_4$-$^3H_5$ electronic transition band also plays a part in the wavelength shifting of the pulse.

Depending on the amplifier parameters (fiber composition, core profile, spectral dependence of the light propagation constant, input seed duration, shape and intensity, polarization, bending losses, pump rate, and pump distribution along the fiber), the pulse and the Raman solitons can be completely or partially separated in time.

In the case that the Raman solitons are completely separated in time (the first mode of operation of the laser), it is possible to generate at a certain pump rate an optical supercontinuum covering the whole spectral region between the input seed and the absorption edge. Further increase in the pump rate will result in the increase of the power of the supercontinuum without broadening of its spectrum. In the case that the Raman solitons are partially separated in time (the second mode of operation of the laser), the seed pulse will amplify the first Raman soliton at the expense of its own energy, the first Raman soliton will amplify the second Raman soliton, and so on. The energy transfer will stop at the last Raman soliton whose spectral position is determined by the position of the absorption edge. This Raman soliton will thus accumulate the energy supplied by the pump.

By changing the pump rate, pump distribution, polarization and seed parameters it is possible to switch between the two described operational modes of one and the same apparatus.

The technical result is the realization of a high-brightness supercontinuum, and a high energy ultra-short seed pulse accumulating the predominant part of the amplifier output spectral energy, and a device which can switch between these two operational modes.

The advantage over the prior art, where the increase of the total supercontinuum power leads to the increase of its spectral area rather than increase in its spectral power density (or, brightness), is that the present invention allows to accumulate the energy in the spectral band of interest without its spectral broadening, or, in other words, to increase the spectral brightness of the supercontinuum source.

Another advantage is the realization of a high-energy pulse comprising the predominant part of the laser output radiation.

BRIEF DESCRIPTION OF THE DRAWINGS

A preferred embodiment of the invention will now be described by way of example only and with reference to the accompanying drawings in which.

DETAILED DESCRIPTION

Figure 1:
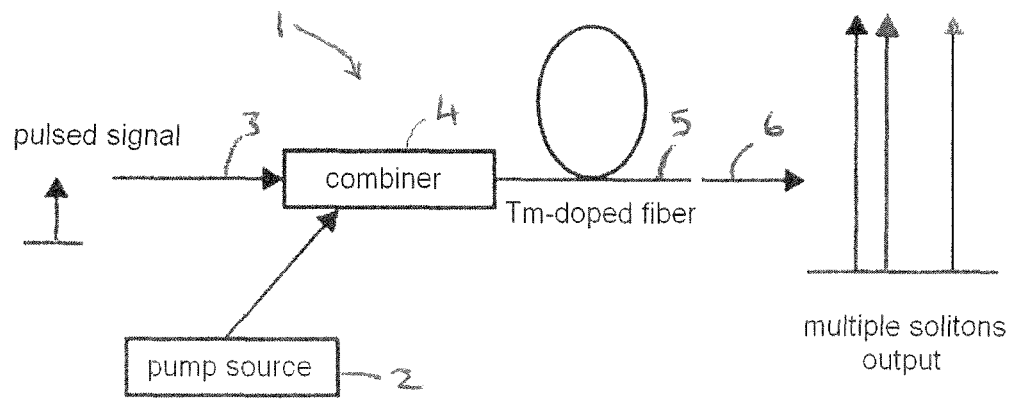
FIG. 1 shows an optical system in which the present invention can be implemented.

The optical system 1 of FIG. 1 includes a pump source 2, a source of seed pulses (seed source) for providing seed pulses 3, a combiner 4, and a fiber amplifier 5.

In operation, the pump source 2 provides pump radiation to the combiner 4, where it is coupled with seed pulses 3 from the seed pulse source. The multiplexed output from the combiner 4 is then input to the fiber amplifier 5, and is output as output pulses 6.

Figure 2:
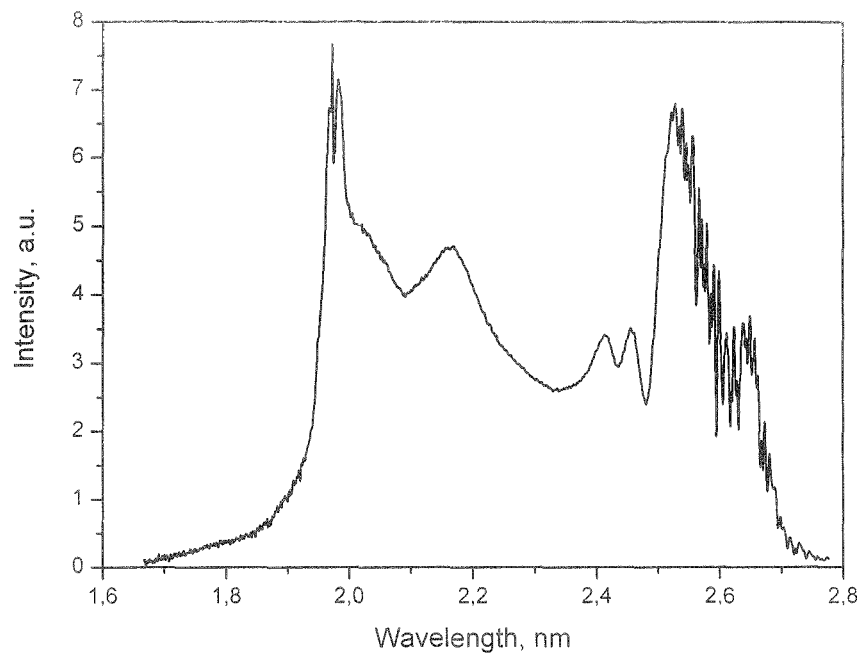
FIG. 2 shows a supercontinuum output spectrum generated by an optical system according to the present invention.

FIG. 2 shows a supercontinuum output spectrum generated by an optical system according to the present invention. The fiber amplifier used was a thulium doped fiber amplifier pumped with pump pulses with a wavelength of 795 nm. The wavelength of the seed pulse was 1970 nm.

The preferred embodiment uses a silica-based thulium-doped optical fiber with OH— groups introduced into the fiber during manufacturing. OH— groups will be present to some extent in most optical fibers, but normally their concentration is reduced as much as possible. Leaving OH— in the fiber to some extent allows controlling the cut-off wavelength and loss (i.e., the more OH—, the shorter the cut-off wavelength and the higher the losses). Thus it is worth noting that OH— groups may exist in different optical glass fibers and thus can play the role providing the requisite optical loss, especially the intense absorption peak situated at the wavelength of 2.7-2.8 μm depending on the specific glass composition.

A supercontinuum or the ultra-short pulses in the wavelength region of 1.8-2.7 μm can be generated by such an optical fiber. Alternatively, a germanate glass fiber or a fiber with high (preferably >50%) germanium oxide content can provide the extension of this spectral range up to 2.8 μm. The silica-based thulium-doped optical fiber is seeded by seed pulses in the region of 1.8-2.1 μm. The preferable pump method is clad-pumping. Clad pumping is important for reaching high output powers and for using direct diode-pumping which is more economical. The pump wavelength is selected from the regions of 0.77-0.82 µm, 1.5-1.65 µm, and 1.18-1.21 µm. Core-pumping method, or any combination of the mentioned above pump possibilities can be used as well. It is possible to generate an ultra-short soliton pulse in the spectral range of 2.2-2.7 µm which carries the predominant part of the output amplifier radiation without applying a spectral filtering in any form.

The invention can be used in industrial and scientific applications such as fine material processing, oil and gas sensing, environment monitoring, and medicine.

The advantage of the amplifier is its natural simplicity and reliability as compared to the existing analogues.

We claim:

1. An optical system, comprising: a fiber amplifier comprising an optically active doped fiber; a source of seed pulses; and a pump source, wherein the doped fiber is doped with one or more active element(s) selected such that the seed pulses are amplified in intensity; the doped fiber has a negative (anomalous) group velocity dispersion in the region from the wavelength of the seed pulses to a threshold wavelength at which the magnitude of the optical loss of the doped fiber is greater than a gain due to stimulated Raman scattering; wherein the optical system is operable in a first and second mode, wherein in the first mode the optical system is operable to generate as its output a high-energy pulse shorter than the seed pulse and comprising the predominant part of the output amplifier radiation without spectral filtering and spectrally shifted to the longer wavelength direction, and wherein in the second mode the optical system is operable to generate as its output an optical supercontinuum.

2. An optical system according to claim 1, wherein the doped fiber has a steeply increasing optical loss at the threshold wavelength, the threshold wavelength being longer than the wavelength of the seed pulse.

3. An optical system according to claim 1, wherein the magnitude of the optical loss is chosen to overcome the gain due to stimulated Raman scattering at the peak intensity of the desired output pulse.

4. An optical system according to claim 1, for generating as its output a high-energy pulse shorter than the seed pulse without spectral filtering and spectrally shifted to the longer wavelength direction and preferably comprising the predominant part of the output amplifier radiation.

5. An optical system according to claim 1, for generating as its output an optical supercontinuum.

6. An optical system according to claim 1, comprising a controller for controlling the source of seed pulses.

7. An optical system according to claim 6, wherein the controller is configured to change at least one of the duration or intensity of the seed pulses in order to change between the first operational mode and the second operational mode.

8. An optical system according to claim 7, wherein the duration of the seed optical pulses is spectrally-limited to less than 100 ps.

9. An optical system according to claim 1, further comprising a controller for controlling the pump source, wherein the controller is configured to change the pump rate in order to change between the first operational mode and the second operational mode.

10. An optical system according to claim 1, wherein the doped fiber is doped with at least one element producing optical loss at the threshold wavelength, or wherein the threshold wavelength is provided by cutting off a fundamental mode or introducing bending losses.

11. An optical system according to claim 1, wherein the fiber is doped with at least one element chosen from the rare-earth group.

12. An optical system according to claim 10, wherein the fiber is doped with at least one element selected from the group comprising: Nd, Er, Yb, Tm, and Ho.

13. An optical system according to claim 10, wherein the fiber is doped with thulium (Tm), the fiber has a negative group velocity dispersion in the region of 1.8 to 2.6 µm; the pump source is preferably arranged to pump at a wavelength from 0.77 to 0.82 µm; and the source of seed pulses preferably provides pulses having wavelengths from 1.8-2.1 µm.

14. An optical system according to claim 10, wherein the fiber is doped with thulium (Tm) and holmium (Ho), the fiber has a negative group velocity dispersion in the region of 1.8 to 2.6 µm; the pump source is preferably arranged to pump at a wavelength from 0.77 to 0.82 µm; and the source of seed pulses preferably provides pulses having wavelengths from 1.8-2.1 µm.

15. An optical system according to claim 10, wherein the fiber is doped with holmium with corresponding choice of pump and seed wavelength.

16. An optical system according to claim 1, wherein the fiber is silica-based.

17. An optical system according to claim 1, wherein the fiber is a germanate glass fiber or a fiber with a germanium oxide content of greater than 50%.

18. An optical system, comprising: a thulium doped fiber amplifier with a negative group velocity dispersion in the region of 1.8 to 2.6 µm; a pump source arranged to pump at a wavelength from 0.77 to 0.82 µm; a source of seed pulses, the seed pulses having wavelengths from 1.8-2.1 µm; and wherein the optical system is operable in a first mode to generate a soliton pulse in the 2.2-2.8 µm region comprising the predominant part of the amplifier output radiation and in a second mode to generate supercontinuum radiation from 1.8-2.6 µm, wherein it is possible to change from one operational mode to another by changing the input parameters of the pump source and seed pulses.

19. An optical system according to claim 18, for generating a series of spectrally separated soliton pulses in the region from the seed pulse wavelength to 2.6 µm.

20. An optical system according to claim 18, for generating a soliton pulse in the 2.2-2.8 µm region comprising the predominant part of the amplifier output radiation.

21. An optical system according to claim 18, for generating supercontinuum radiation from 1.8-2.6 µm.

22. A method of operating an optical system, comprising: providing a thulium-doped fiber amplifier, the thulium-doped fiber amplifier having a negative group velocity dispersion in the region of 1.8 to 2.6 µm; seeding the thulium-doped fiber amplifier with seed pulses having the wavelengths from 1.8-2.1 µm; pumping the thulium-doped fiber amplifier at any wavelengths from 0.77-0.82 µm; and generating a series of spectrally separated soliton pulses in the spectral region from the seed pulse wavelength to 2.6 µm in a first mode of operation, and in a second mode of operation, generating supercontinuum radiation covering the region of 1.8-2.6 µm.

23. A method according to claim 22, comprising generating a soliton pulse with a wavelength of 2.2-2.5 µm, such that the generated soliton pulse carries the predominant part of the amplifier output power.

24. A method according to claim 23, comprising generating a series of spectrally separated soliton pulses in the spectral region from the seed pulse wavelength to 2.6 µm.

25. A method according to claim 22, comprising generating supercontinuum radiation covering the region of 1.8-2.6 μm.

26. A method according to claim 22, wherein in the first mode of operation, the series consists of at least one soliton pulse in the region of 2.2-2.5 μm carrying the predominant part of the amplifier output power.

27. A method according to claim 22, wherein the operational mode is changed between the two modes by change of the input parameters of pump and seed.

* * * * *